Nov. 21, 1967  J. J. SCANLON, JR., ET AL  3,353,438

DEVICE FOR MOLDING CASELESS AMMUNITION

Filed Aug. 1, 1966

INVENTORS:
John J. Scanlon Jr.
Joseph B. Quinlan
Harry M. Saragovitz
Edward J. Kelly, Herbert Beil
E. S. Dubroff
ATTORNEYS.
FRANKFORD ARSENAL.

3,353,438
DEVICE FOR MOLDING CASELESS AMMUNITION
John J. Scanlon, Jr., Burlington County, N.J., and Joseph B. Quinlan, Philadelphia County, Pa., assignors to the United States of America as represented by the Secretary of the Army
Filed Aug. 1, 1966, Ser. No. 569,530
5 Claims. (Cl. 86—1)

ABSTRACT OF THE DISCLOSURE

A device for molding propellant cylinders for use in caseless ammunition comprising a first cylindrical member having an axial opening defining an outer diameter of the cylinder to be molded. A multi-diameter elongate punch member is insertable into one end of said axial opening to define an inner diameter of the cylinder to be molded. A second cylindrical member being inserted into the other end of said axial diameter and having an outer diameter equal to the inner diameter of the axial opening of said first cylindrical member.

---

This invention relates to a device for molding caseless ammunition and more particularly to a device for molding propellant cylinders for use in caseless ammunition.

In the past, propellant cylinders for use in caseless ammunition were provided with a solid portion at one end and a hollow portion at its other end. The solid portion was provided with a central pocket for holding a primer therein. This type of construction is described in U.S. Patent No. 3,212,440, issued to Joseph B. Quinlan et al., for "Molded Caseless Small Arms Ammunition."

One of the methods of producing this type of cylinder was to compress the propellant in a mold. When the cylinder became solid, it was removed from the mold and an axial cavity was drilled therein. This technique was time-consuming and dangerous. The speed of the drill and the rate of drill feed were important factors to be considered because of inherent dangers involved when and if the temperature of the drill became too hot. It was thus necessary to drill very slowly, not only to prevent its temperature build up, but the axial cavity had to be perfectly centered. After drilling, one end portion of the cylinder was machined to produce the tapered neck portion necessary in the formation of caseless rounds.

Another method of producing propellant cylinders for caseless ammunition was to mold the cylinder with a partial axial cavity already therein. This method minimized the abovementioned danger by eliminating the drilling step, but presented another problem, namely, the obtention of different densities in the solid portion and around the hollow portion. The technique involved was to pack the mold with granules of propellant and insert a punch, shaped to form the proper cavity, into the mold to thereby compact the granules into the desired molded form. This technique resulted in a greater density of the cylinder at its solid portion due to excess granules being forced into the necessary volume, than along the walls of the remaining portion of the cylinder. Because of these deficiencies, proper and uniform ballistics were difficult to obtain.

It is, therefore, an object of the present invention to provide a device for molding propellant cylinders for caseless ammunition having a constant density.

Another object is to provide a device for molding propellant cylinders for caseless ammunition that is safe and fast.

A further object is the provision of a device for molding propellant cylinders for caseless ammunition that forms a perfectly centered axial cavity within the finished product.

The above objects as well as others together with the benefits and advantages of the invention will be apparent upon reference to the detailed description set forth below, particularly when taken in conjunction with the drawings annexed hereto in which.

Figure 1:
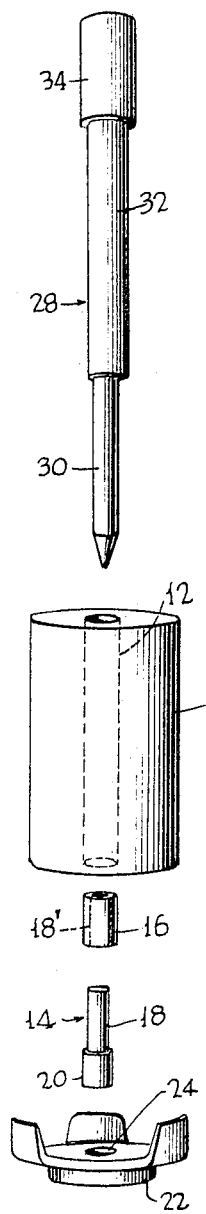
FIG. 1 illustrates an exploded view of the invention.
Figure 2:
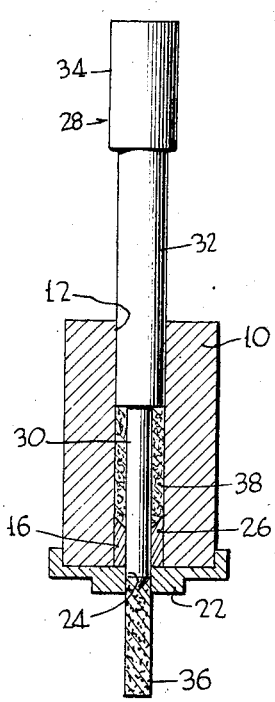
FIG. 2 illustrates an operation in the forming of a propellant cylinder for caseless ammunition.

Referring now to the drawings, a die 10 has an axial opening or passageway 12 therethrough. A cylinder stop 14 is constructed so as to be capable of blocking the passageway 12 while retaining a hollow cylinder neck collar 16 in place in the bottom of passageway 12. The stop 14 has a reduced portion 18 on the forward end, of equal diameter to the inner diameter of the collar 16 as shown by the dotted lines 18', and an enlarged portion 20 at the rearward end thereof. A base piece 22 having an axial opening 24 therethrough, of a diameter equal to the enlarged portion 20 of the member 14 is secured to the bottom portion of the die 10. The enlarged portion 20 of the stop 14 is frictionally secured in the opening 24 of the base piece 22. The forward end of collar 16 is V-shaped, as at 26, to provide a tapered shape to the propellant to be molded. A multidiameter punch 28 has a first diameter 30, of substantially the same size as the opening 24 of the base piece 22. A second diameter 32 has substantially the same size as the passageway 12 of the die 10 and a third diameter 34 is of a size large enough so as not to pass through passageway 12 of die 10.

In operation, the cylinder stop 14 is inserted into the hollow portion of the collar 16 which is then inserted into the passageway 12 of the die 10 and secured thereto by base piece 22. A known mixture of propellant binder and granules is then inserted into the passageway 12 from the top. The contents are then pressed with punch 28 which in turn pushes a core 36 of propellant and the cylinder stop 14 through the opening 24 of the base piece 22. Continued pressure consolidates the propellant charge 38 into one of constant density. The pressure applied to punch 28 is then decreased to zero and the base piece 22 removed. Pressure is then reapplied to the punch 28 thereby pushing the cylinder of molded propellant 38 and the collar 16 downwardly through the passageway 12 of die 10. The molded propellant 38 is then removed from the punch 28.

Obviously many variations and modifications of the present invention are possible in light of the above teachings. It is, therefore, to be understood, that within the scope of the appended claims, the invention may be practiced otherwise than as specifically described.

We claim:
1. A device for molding propellant cylinders for use in caseless ammunition including,
    a first cylindrical member having an axial opening therethrough, said axial opening defining an outer diameter of the cylinder to be molded, a multi-diameter elongate punch member, said elongate member being insertable into one end of said axial opening of said cylindrical member and having a first diameter adapted to define an inner diameter of the cylinder to be molded, a second diameter equal to the inner diameter of said axial opening of said first cylindrical member, and a third diameter adapted to define a diameter larger than said axial opening of said first cylindrical member, and a second cylindrical member being insertable into the other end of said axial opening of said cylindrical member and having an outer diameter equal to the inner diameter of said axial opening of said first cylindrical member.

2. A device of the type described in claim 1 wherein said second cylindrical member has an axial cavity extending therethrough, a second elongate member, said second elongate member being insertable into said axial cavity of said second cylindrical member.

3. A device of the type described in claim 2 including a base piece, said base piece being so constructed and arranged to act as a seat for said first cylindrical member.

4. A device of the type described in claim 3 wherein said base piece has an axial opening therein of sufficient size permitting the second elongate member to pass therethrough but not said second cylindrical member.

5. A device of the type described in claim 4 wherein said second cylindrical member is inwardly tapered to aid in the formation of a tapered neck portion on the cylinder to be molded.

References Cited

UNITED STATES PATENTS

| | | | |
|---|---|---|---|
| 1,913,344 | 6/1933 | Slusser | 102—98 X |
| 3,034,393 | 5/1962 | Lieberman et al. | 86—1 |

BENJAMIN A. BORCHELT, *Primary Examiner.*

SAMUEL FEINBERG, *Examiner.*

P. A. SHANLEY, *Assistant Examiner.*